(12) United States Patent
Nagata et al.

(10) Patent No.: US 9,900,569 B2
(45) Date of Patent: Feb. 20, 2018

(54) PROJECTION-TYPE IMAGE DISPLAY DEVICE

(71) Applicant: Hitachi Maxell, Ltd., Ibaraki-shi, Osaka (JP)

(72) Inventors: Eriko Nagata, Ibaraki (JP); Shinji Onodera, Ibaraki (JP); Satomi Morishita, Ibaraki (JP); Naoya Oka, Ibaraki (JP); Masaaki Iwanaga, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 15/322,980

(22) PCT Filed: Jul. 4, 2014

(86) PCT No.: PCT/JP2014/067922
§ 371 (c)(1),
(2) Date: Dec. 29, 2016

(87) PCT Pub. No.: WO2016/002069
PCT Pub. Date: Jan. 7, 2016

(65) Prior Publication Data
US 2017/0155880 A1  Jun. 1, 2017

(51) Int. Cl.
*G03B 21/20* (2006.01)
*H04N 9/31* (2006.01)
(Continued)

(52) U.S. Cl.
CPC ....... *H04N 9/3191* (2013.01); *G03B 21/2026* (2013.01); *G06T 5/00* (2013.01);
(Continued)

(58) Field of Classification Search
CPC ............ G03B 21/2026; G03B 21/2053; G03B 21/202; H04N 9/315; H04N 9/3155; H04N 9/3188; H04N 9/3194
(Continued)

(56) References Cited

U.S. PATENT DOCUMENTS

2010/0110395 A1   5/2010  Kotani et al.
2013/0088693 A1*  4/2013  Terashima ............... G09G 3/20
                                                    353/85

FOREIGN PATENT DOCUMENTS

JP  2004-039563 A   2/2004
JP  2005-084075 A   3/2005
(Continued)

OTHER PUBLICATIONS

Hiroshi; JP2005-084075A; Machine Translation in English.*
Search Report issued in corresponding International Patent Application No. PCT/JP2014/067922, dated Oct. 7, 2014.

*Primary Examiner* — Ryan Howard
(74) *Attorney, Agent, or Firm* — McDermott Will & Emery LLP

(57) ABSTRACT

This projection-type image display device is provided with: a lamp drive unit that drives a lamp; a lamp voltage detection unit that detects a lamp interelectrode voltage (hereinafter referred to as a lamp voltage); an image correction unit that corrects image qualities of image signals to be supplied to an image display element; and a control unit that controls a correction quantity of the image correction unit on the basis of the lamp voltage detected by means of the lamp voltage detection unit. Consequently, deterioration of visibility of a projection image can be suitably suppressed.

10 Claims, 13 Drawing Sheets

(51) Int. Cl.
    *G06T 5/00*           (2006.01)
    *H04N 9/44*          (2006.01)
    *G09G 3/00*          (2006.01)
    *G06F 3/0483*       (2013.01)

(52) U.S. Cl.
    CPC ............... *G09G 3/002* (2013.01); *H04N 9/44* (2013.01); *G03B 21/2053* (2013.01); *G06F 3/0483* (2013.01); *G09G 2320/0233* (2013.01); *G09G 2320/045* (2013.01); *G09G 2320/066* (2013.01); *G09G 2320/0626* (2013.01); *G09G 2320/0673* (2013.01); *G09G 2320/08* (2013.01); *G09G 2354/00* (2013.01); *H04N 9/3155* (2013.01); *H04N 9/3182* (2013.01)

(58) Field of Classification Search
    USPC .......................................................... 353/85
    See application file for complete search history.

(56) References Cited

FOREIGN PATENT DOCUMENTS

| | | | |
|---|---|---|---|
| JP | 2009-258345 | A | 11/2009 |
| JP | 2010-113091 | A | 5/2010 |
| JP | 2010-210742 | A | 9/2010 |

\* cited by examiner

F I G. 4
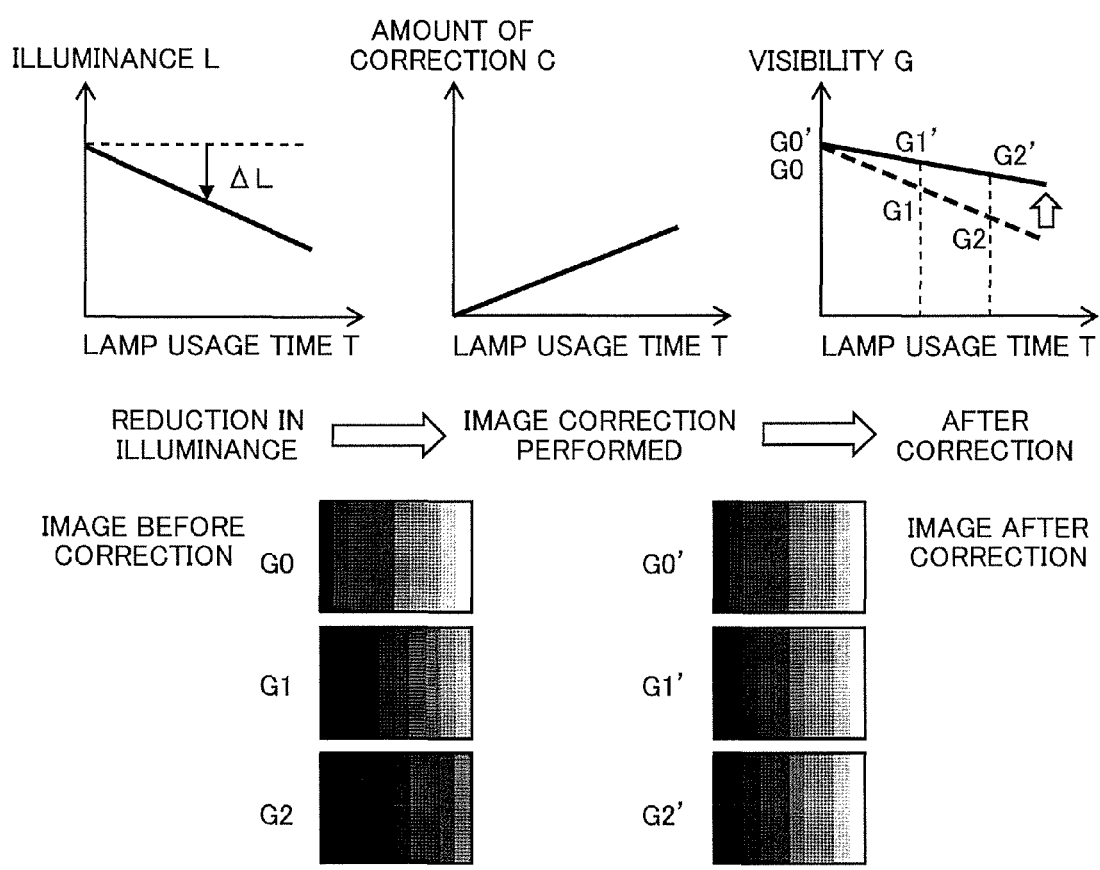

F I G. 5 B (a)

|  | RELATIVE ILLUMINANCE | AMOUNT OF CORRECTION |
|---|---|---|
| LAMP MODE 1 | 100% | C1 |
| LAMP MODE 2 | 70% | C2 |
| LAMP MODE 3 | 50% | C3 |

(b)

| | | RELATIVE ILLUMINANCE | AMOUNT OF CORRECTION |
|---|---|---|---|
| LAMP MODE 1 | | 100% | C1 |
| LAMP MODE 2 | | 70% | C2 |
| LAMP MODE 3 | | 50% | C3 |
| LAMP MODE 4 (Auto) | STATE 1 | 100% | C41 |
| | STATE 2 | 70% | C42 |
| | STATE 3 | 50% | C43 |

F I G. 5 C
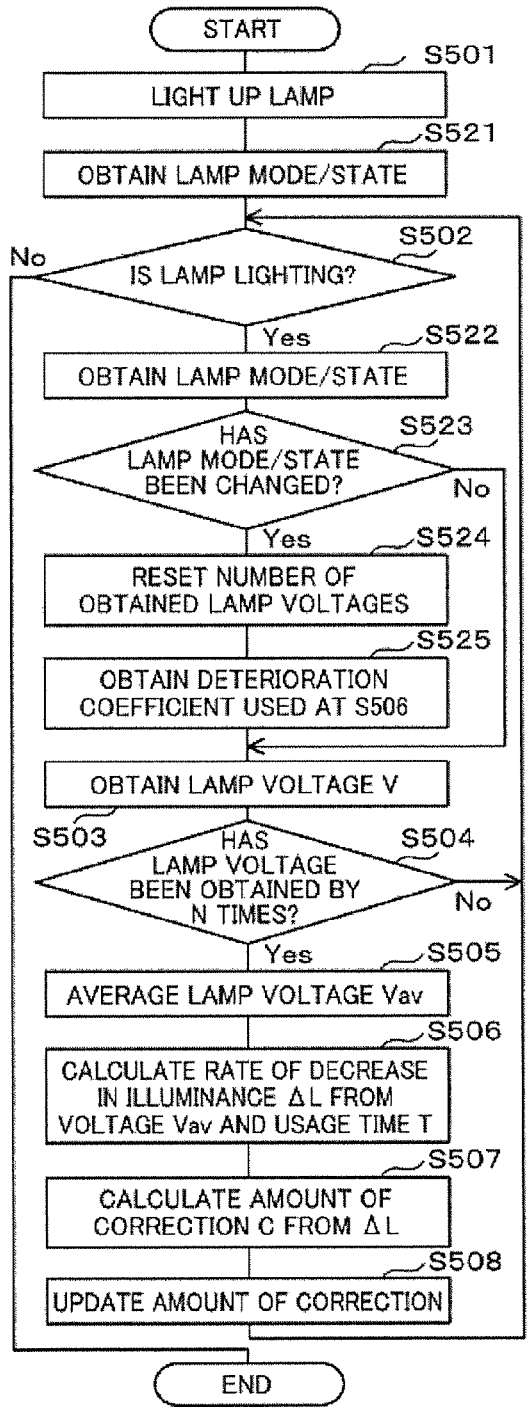
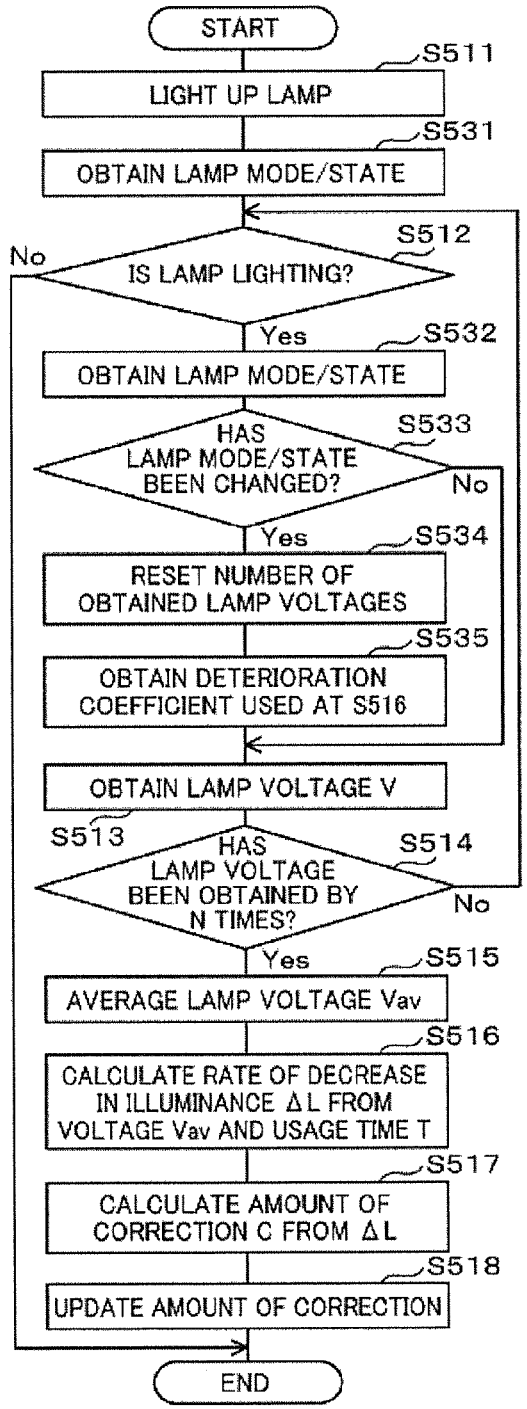

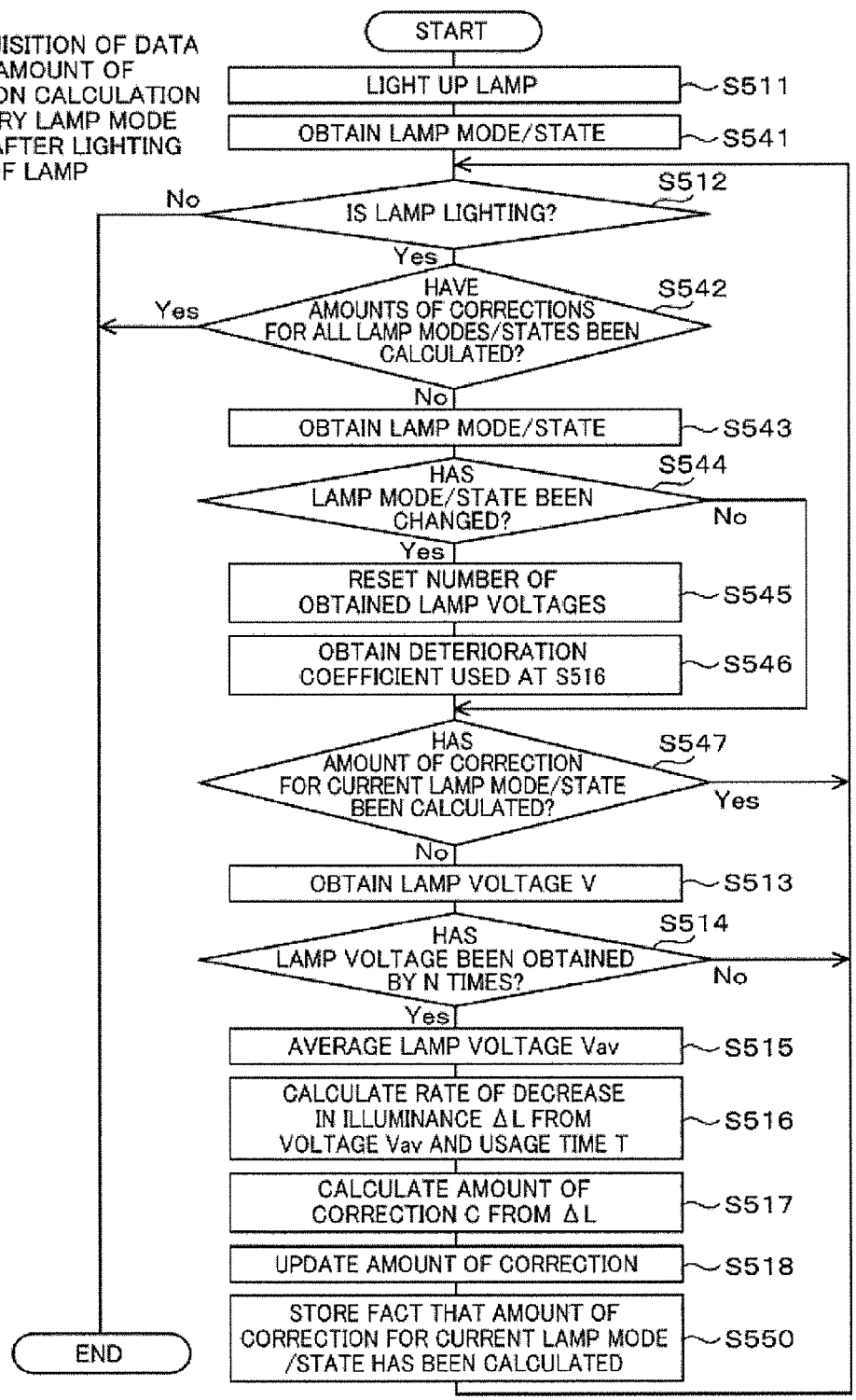

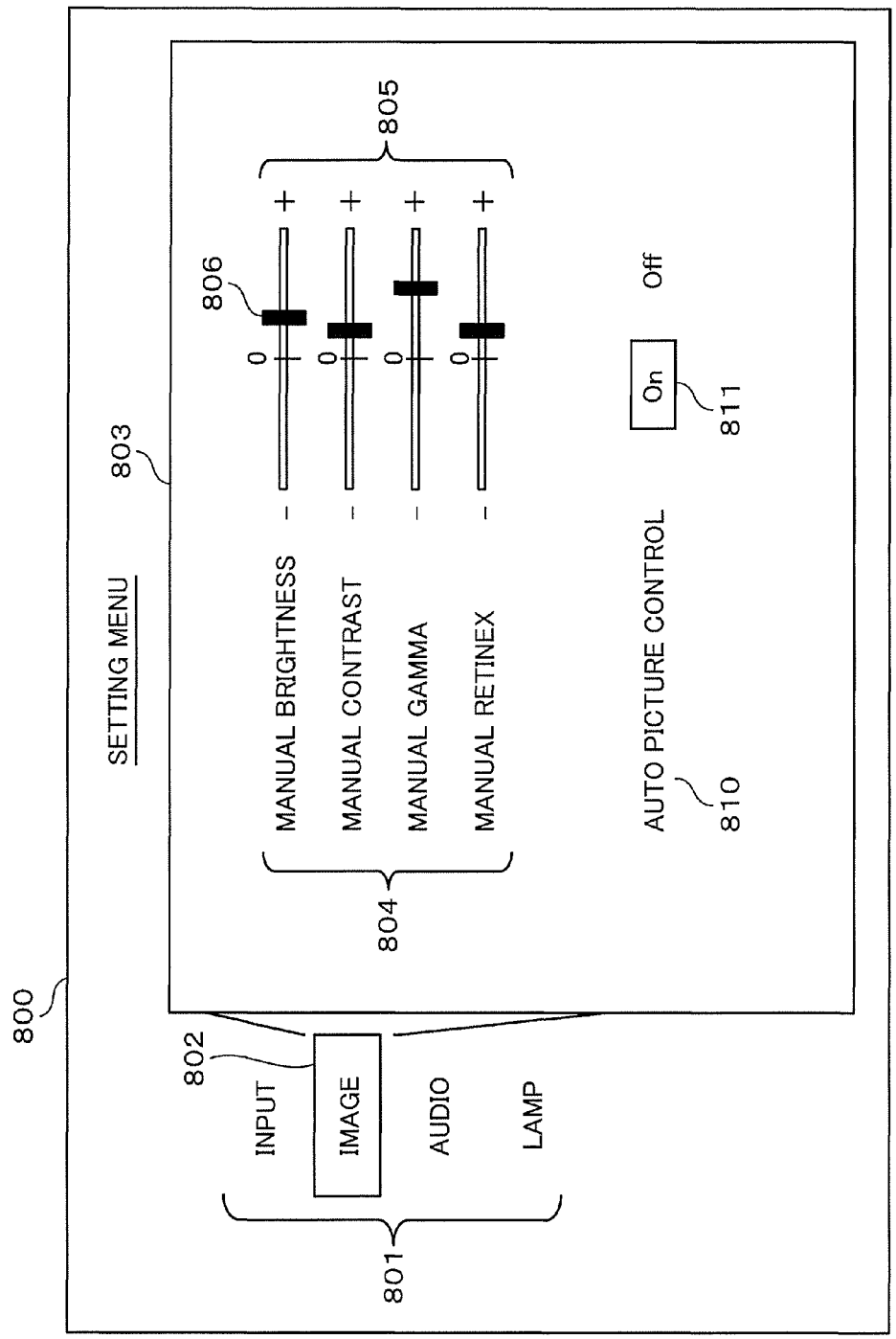

PROJECTION-TYPE IMAGE DISPLAY DEVICE

CROSS REFERENCE

This application is the U.S. National Phase under 35 U.S.C. § 371 of International Application No. PCT/JP2014/067922, filed on Jul. 4, 2014, the entire contents of each are hereby incorporated by reference.

TECHNICAL FIELD

The present invention relates to a projection-type image display device that performs image correction processing according to deterioration in illuminance.

BACKGROUND ART

A discharge lamp used for a projection-type image display device has a problem of reduction in image quality such as a contrast of a projected image caused by deterioration in illuminance due to instability of discharge at startup and long-term use. As a technique pertaining to this, Patent Literature 1 discloses a configuration that detects an arc failure between electrodes of a discharge lamp by a lamp voltage detection circuit (lamp current detection circuit) or an optical sensor to control the lamp. Patent Literature 2 discloses a configuration that detects an illuminating light of a lamp by an optical sensor, notifies a state change in the illuminating light, and adjusts a projected state of an image.

CITATION LIST

Patent Literature

PTL 1: Japanese Patent Application Laid-Open No. 2004-39563
PTL 2: Japanese Patent Application Laid-Open No. 2010-210742

SUMMARY OF INVENTION

Technical Problem

The technique disclosed in Patent Literature 1 detects the arc failure in the discharge lamp by the lamp voltage detection circuit or a similar circuit to control a lamp drive circuit. An object of the technique is to restrain the arc failure, stabilize the discharge, restrain a flicker of the projected image, and improve uniformity of a light distribution of the image. That is, the technique does not cope with a deterioration over time in intensity of illumination due to an accumulated usage period and frequency of use of the lamp.

The technique disclosed in Patent Literature 2 detects the deterioration in illuminating light of the lamp by the optical sensor to control the projected state of the image. If a reduction in luminance level exceeds an allowable limit, a warning to request a lamp exchange is issued. Patent Literature 2 describes that, if the reduction in luminance level is within the allowable limit but a color balance decays, image processing for color correction is performed.

Both literatures have a problem that, if the reduction in illuminance of the lamp does not reach the level for lamp exchange, the reduction in illuminance is not compensated, thereby deteriorating an image quality of a projection image and reducing visibility. The configuration that detects the deterioration in illuminating light of the lamp by the optical sensor causes the following problems. Since the optical sensor is newly disposed, a cost increases. A detection error caused by a mounting position of the sensor with respect to the discharge lamp is likely to occur.

An object of the present invention is to provide a projection-type image display device that detects deterioration in illuminance over time of a discharge lamp with a simple configuration to restrain a reduction in visibility of a projection image due to the deterioration in illuminance.

Solution to Problem

The present invention is a projection-type image display device that uses a discharge lamp as a light source to project an optical image formed by an image display element. The projection-type image display device includes a lamp voltage detection unit, an image correction processing unit, and a control unit. The lamp voltage detection unit is configured to detect a voltage between electrodes (hereinafter, a lamp voltage) of the discharge lamp. The image correction processing unit is configured to correct an image quality of an image signal supplied to an image display element. The control unit is configured to control an amount of correction for the image correction processing unit based on the lamp voltage detected by the lamp voltage detection unit.

Furthermore, a lighting period managing unit is provided. The lighting period managing unit is configured to manage an accumulated lighting period (hereinafter, a lamp usage period) of the discharge lamp. The control unit is configured to control the amount of correction for the image correction processing unit based on the lamp voltage detected by the lamp voltage detection unit and the lamp usage period obtained from the lighting period managing unit.

Advantageous Effects of Invention

The present invention has an effect to preferably ensure further restraining a decrease in visibility of a projection image.

BRIEF DESCRIPTION OF DRAWINGS

FIG. 4 is drawings describing image correction processing and an effect thereof.

FIG. 5B is explanatory views on use modes or use states of a lamp and a management of amounts of correction.

FIG. 5C is flowcharts illustrating an example of processes corresponding to a change in use mode or use state of the lamp.

FIG. 5D is a flowchart illustrating processes corresponding to the change in use mode or use state of the lamp.

FIG. 8B is a drawing illustrating an example of the image quality adjustment menu of the projection-type image display device according to Example 1.

DESCRIPTION OF EMBODIMENTS

The following describes examples of the present invention with reference to the drawings.

Example 1

Figure 1:
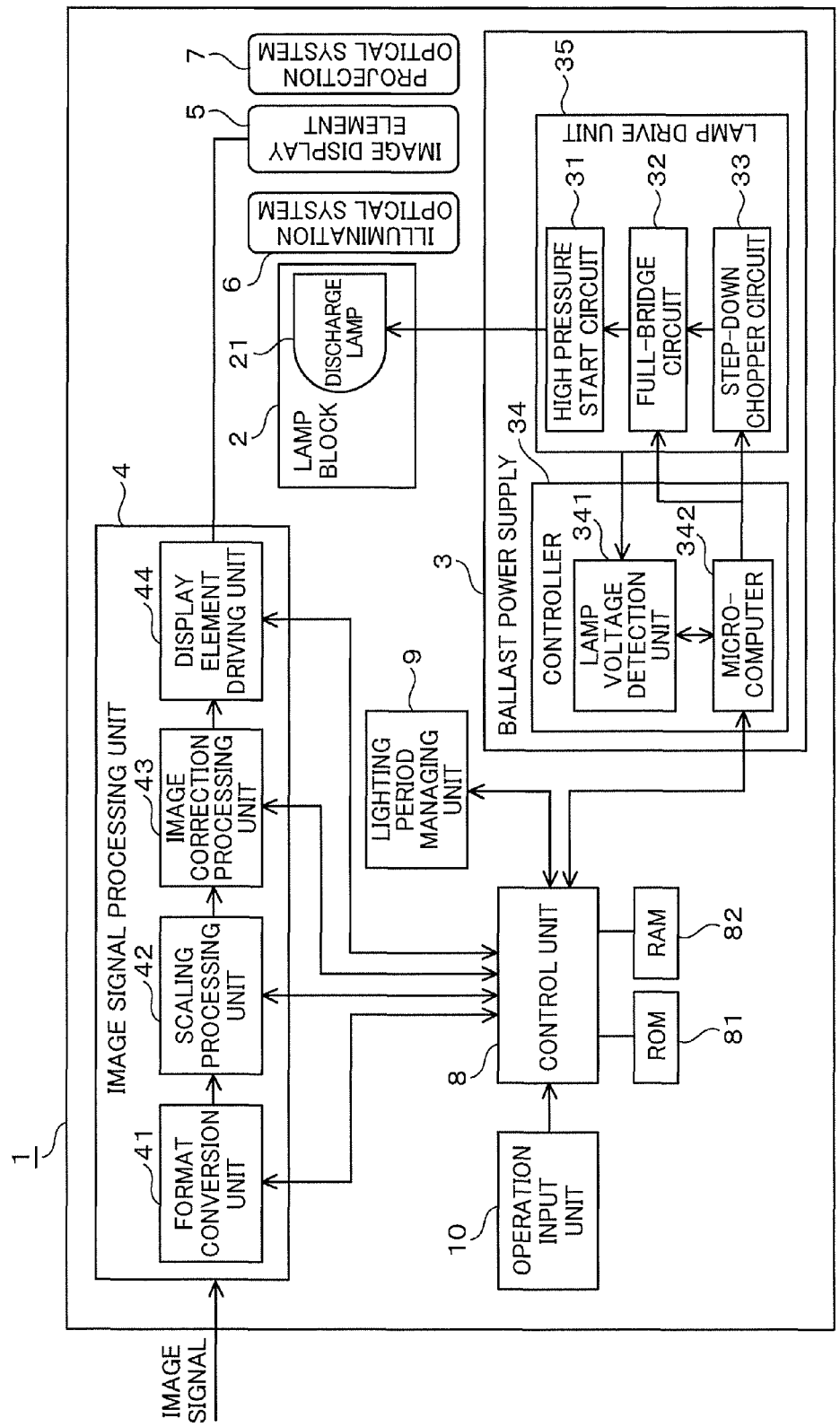
FIG. 1 is a block configuration diagram illustrating a projection-type image display device according to Example 1.

FIG. 1 is a block configuration diagram illustrating a projection-type image display device according to Example 1. A projection-type image display device 1 includes a lamp block 2, a ballast power supply 3, an image signal processing unit 4, an image display element 5, an illumination optical system 6, a projection optical system 7, a control unit 8, a lighting period managing unit 9, and an operation input unit 10.

The lamp block 2 houses a discharge lamp 21 such as an ultrahigh pressure mercury lamp, a xenon lamp, and a metal halide lamp serving as a light source.

The ballast power supply 3 is a circuit to stably supply electric power required to light up a lamp to the discharge lamp 21. The ballast power supply 3 includes a step-down chopper circuit 33, a full-bridge circuit 32, a high pressure start circuit 31, and a controller 34. The step-down chopper circuit 33 sets a lamp voltage appropriate for the discharge lamp 21. The full-bridge circuit 32 performs a conversion into an AC-lighting voltage/current. The high pressure start circuit 31 applies a start voltage required for the discharge lamp 21. The controller 34 controls these circuits. To continue the stable lighting of the discharge lamp 21, the ballast power supply 3 performs a control such that a power consumption becomes a predetermined value. The controller 34 includes a lamp voltage detection unit 341 and a microcomputer 342, which is means for communications of information on the lamp voltage or similar information with the control unit 8. In this example, the "microcomputer" means a microcontroller, a microprocessor, or a similar device.

The image signal processing unit 4 includes a format conversion unit 41, a scaling processing unit 42, an image correction processing unit 43, and a display element driving unit 44. The format conversion unit 41 appropriately converts input image signals. The scaling processing unit 42 performs enlargement/reduction processing on the image signals according to a size of a display area. The image correction processing unit 43 performs image correction processing on the image signals. The display element driving unit 44 supplies driving signals according to the image signals to the image display element 5. It is only necessary for the image correction processing unit 43 to perform an image quality correction to compensate a decrease in illuminance, such as a brightness correction, a contrast correction, a sharpness correction, and a gamma correction. As another example of the image processing performed by the image correction processing unit 43, so-called retinex processing may be performed. As another example of the image processing performed by the image correction processing unit 43, for example, image processing as disclosed in Japanese Patent Application Laid-Open No. 2014-72595 may be performed. The image processing separates and extracts a plurality of kinds of light components with different properties in an image. Then, the image processing changes weighting and re-combines the components to further enhance visibility of the image. Furthermore, as another example of the image processing performed by the image correction processing unit 43, a process to combine output signals from a plurality of kinds of retinex processing according to a feature value of an input image may be performed. These processes need not to be performed all, and one kind of process may be performed. Alternatively, some of these processes may be processed in combination. The image quality correction processing not described above as the example may be employed. The control unit 8 may determine the selection of the kind of the correction according to a category of the image.

The image display element 5 is an element to input image signals and form optical images. A liquid crystal panel, a Digital Mirror Device (DMD, trademark of Texas Instruments Incorporated. in the United States of America), or a similar device is used for the image display element 5. For example, for color image display by liquid crystal panel system, a plurality of liquid crystal panels for R, G, and B are used.

The illumination optical system 6 condenses light emitted from the discharge lamp 21 for additional uniformity, and irradiates the image display element 5 with the light. The projection optical system 7 enlarges and projects the optical image formed by the image display element 5 on a projection surface (such as a screen).

The control unit 8 controls operations of the ballast power supply 3 and the image signal processing unit 4. Especially in this example, the control unit 8 communicates with the microcomputer 342 in the ballast power supply 3, obtains a lamp voltage, obtains information on a lamp usage period from the lighting period managing unit 9, and calculates the reduction in illuminance of the lamp. According to the calculated amount of reduction in illuminance, the control unit 8 instructs the image correction processing unit 43 in the image signal processing unit 4 to perform the image correction processing. For the calculation of the reduction in illuminance and the determination on an amount of correction, a ROM 81 and a RAM 82 preliminary store deterioration characteristic data required for the calculation.

The operation input unit 10 obtains the operation input from a user via a button on main body or a signal from a remote controller. The operation input unit 10 transmits information regarding the operation input from the user to the control unit 8 to control the projection-type image display device 1 through this operation input. To perform the process according to the operation input from the user, which is identified by this information, the control unit 8 that has obtained this information transmits control information to a unit requiring the information in the projection-type image display device 1 for control.

Figure 2:
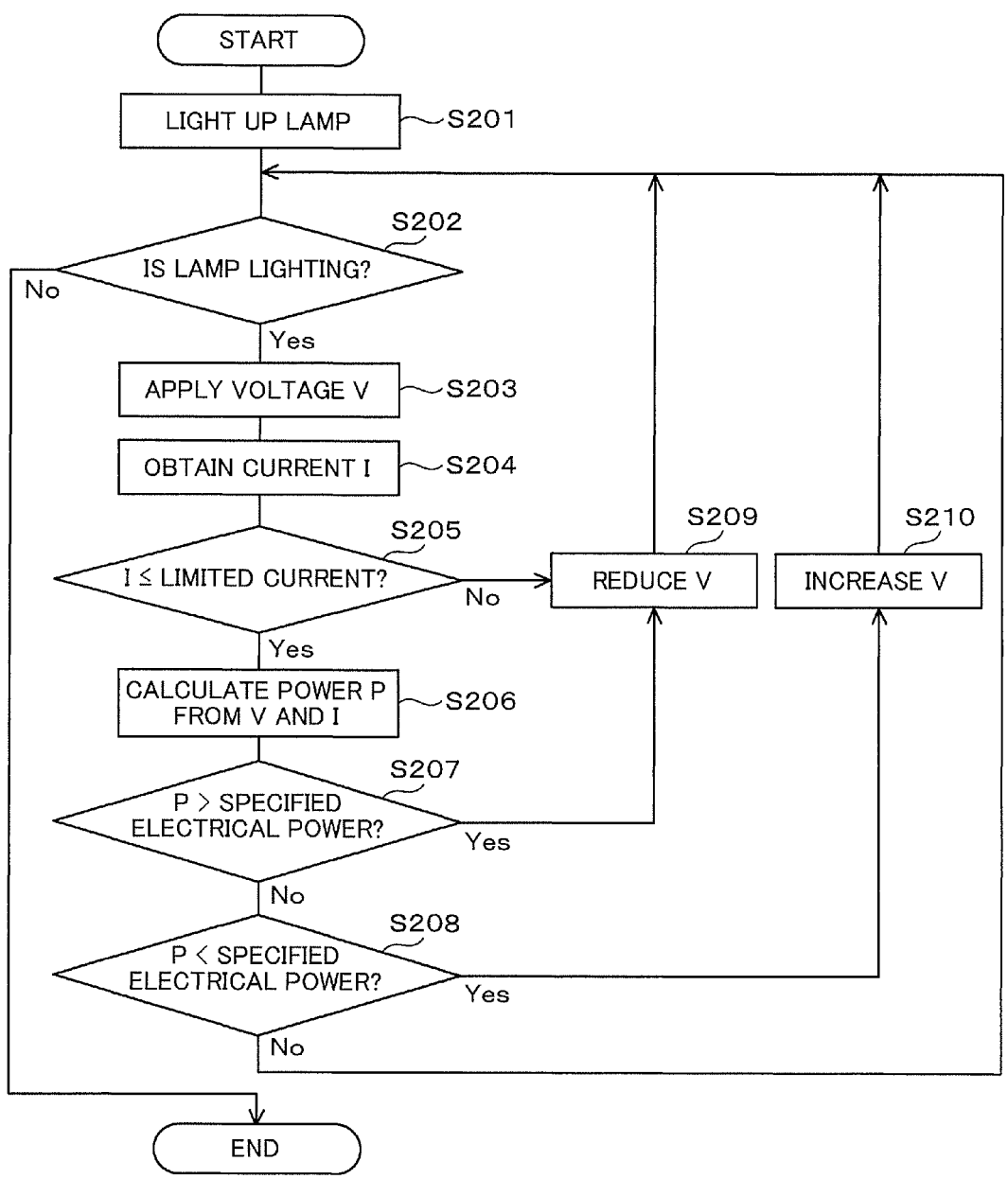
FIG. 2 is a flowchart illustrating operations of a ballast power supply 3.

FIG. 2 is a flowchart illustrating the operations of the ballast power supply 3. The ballast power supply 3 performs the control in the following procedure such that the power consumption of the discharge lamp 21 becomes a specified value.

The lamp is lit up at S201 and whether the lamp is lit or not is judged at S202. When the lamp is lighting, the process proceeds to S203. The high pressure start circuit 31 applies a predetermined voltage V to the discharge lamp 21. A current I of the lamp is obtained at S204. At S205, whether the current I is equal to or less than a limited current or not is judged. When the current I is equal to or less than the limited current, the process proceeds to S206, and an electric power P is calculated from the voltage V and the current I (P=V×I). When the limited current is exceeded, the process proceeds to S209 and the voltage V is reduced by a predetermined amount.

At S207, whether the calculated electric power P exceeds specified electric power or not is judged. When the electric power P exceeds the specified electric power at S207, the process proceeds to S209 and the voltage V is reduced by the predetermined amount. When the electric power P is equal to or less than the specified electric power at S207, the process proceeds to S208. When the electric power P is less than the specified electric power at S208, the process proceeds to S210 and the voltage V is increased by the predetermined amount. When the electric power P is equal to the specified electric power at S208, the voltage V is not adjusted. After that, the process returns to S202, and the above-described operations are repeated until the light of the lamp is put out.

The above-described control automatically applies the optimum voltage V to the discharge lamp 21 such that the electric power P of the lamp becomes the specified electric power within the range where the lamp current I does not exceed the limited current.

This example predicts the reduction in illuminance of the discharge lamp 21 from the lamp voltage and the lamp usage period to perform the image correction processing according to the deterioration in illuminance. The following describes the operations and principle.

Figure 3A:
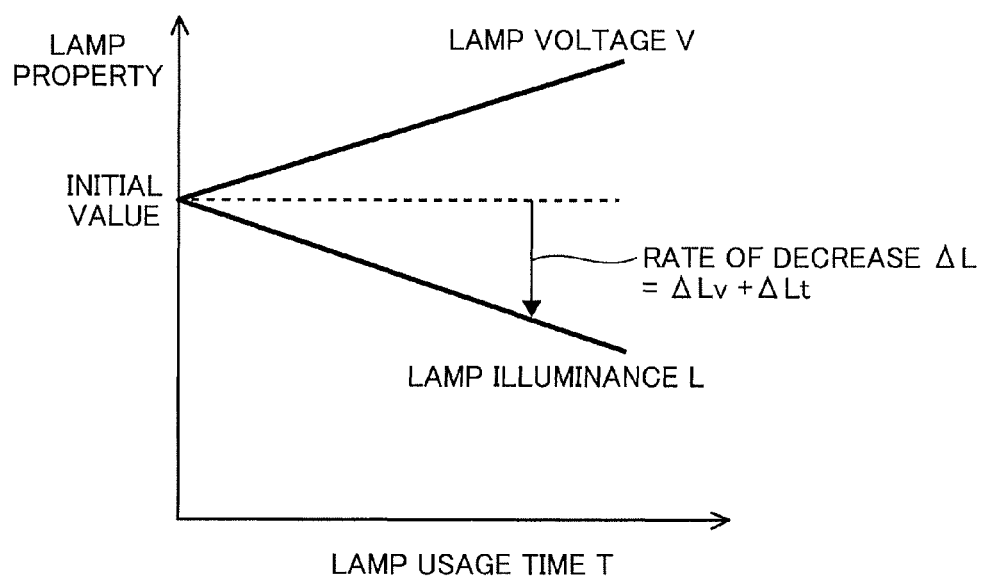
FIG. 3A is a drawing illustrating a relationship between a lamp usage period T and lamp properties.

FIG. 3A is a drawing illustrating one model of a relationship between a lamp usage period T and lamp properties. A lamp illuminance L and the lamp voltage V are shown as the lamp properties. The lamp illuminance L is the illuminance irradiated from the discharge lamp 21 to a screen, and the lamp voltage V is a voltage value between electrodes. ΔL is a rate of decrease of the lamp illuminance L from an initial state.

As the elapse of the lamp usage period T, the lamp illuminance L decreases and ΔL increases. This involves the increase in the lamp voltage V. The relationship between both is examined. A long-term use of the lamp wears the electrodes and extends a distance between the electrodes, resulting in an increase in resistance between electrodes R. As described above, the lamp is controlled so as to keep the power consumption P constant. Since a relationship between the power consumption P, the electrical resistance R, and the lamp voltage V is: $P=V^2/R$, $V=(P \cdot R)^{1/2}$ is met. When P is constant and R increases, V increases. Accordingly, the deterioration in the lamp can be predicted from the lamp voltage V.

The following gives a reason that the illuminance is reduced by the deterioration in lamp. Even if the electrodes of the lamp are deteriorated, the lamp power consumption P is controlled to be constant. Therefore, a total amount of light emitted from the lamp itself does not decrease so much. However, the extension of the distance between the electrodes and an increase in arc reduce emitted parallel lights, thus reducing the amount of light retrieved to the image display element 5. That is, this reduces usage efficiency as the illuminating light, resulting in reduction in brightness of the projection image.

The deterioration in the electrodes of the lamp reduces the brightness of projection image due to the above-described reason. Since this deterioration in electrodes can be predicted from the lamp voltage V, the reduction in illuminance caused by the deterioration in electrodes can be predicted from the lamp voltage V.

Apart from the deterioration in electrodes of the discharge lamp 21, a change in quality (devitrification) of glass of an arc tube deteriorates transmittance, thus reducing the illuminance of the lamp. This phenomenon is different from the deterioration in electrodes (the change in lamp voltage V) and depends on a lamp usage period T.

Thus, the deterioration in illuminance of lamp has two factors. Accordingly, as illustrated in FIG. 3A, the rate of decrease in illuminance ΔL includes the two factors: a rate of decrease in illuminance ΔLv predictable from the lamp voltage V and a rate of decrease in illuminance ΔLt predictable from the lamp usage period T. Here, the relationship between the lamp illuminance, the lamp voltage V, and the lamp usage period T shown in FIG. 3A is the one model. Actually, the relationship between the lamp usage period T and the lamp voltage V differs depending on the individual difference of lamps.

Figure 3B:
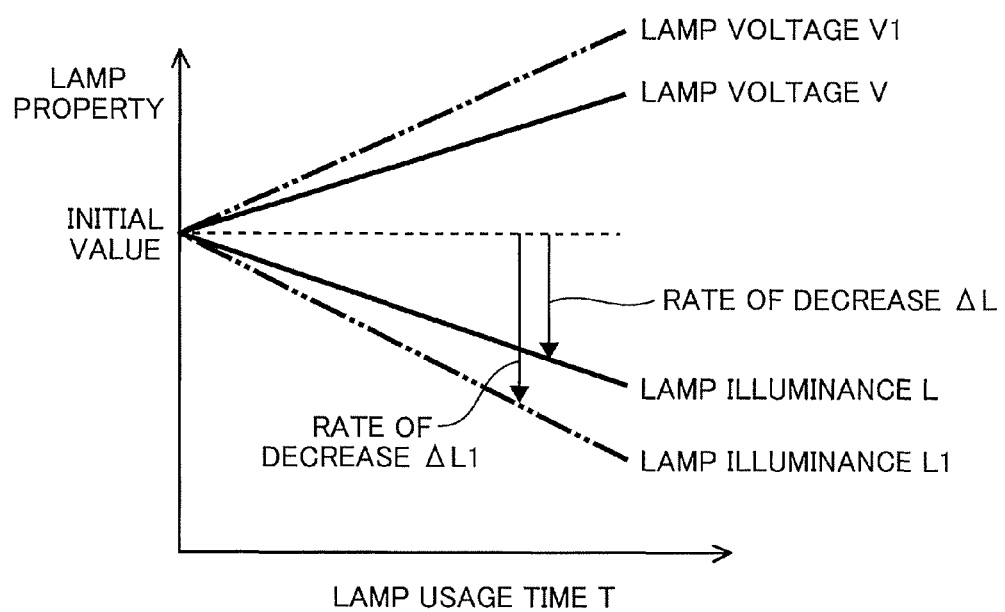
FIG. 3B is a drawing illustrating a relationship between the lamp usage period T and the lamp property.

For example, as illustrated in FIG. 3B, depending on the lamp, the change in lamp voltage with respect to the lamp usage period T is as shown by the lamp voltage V1. The lamp voltage V1 possibly increases faster than the lamp voltage V for the model in FIG. 3A. In this case, a part of the rate of decrease in illuminance predictable from the lamp voltage increases faster than the model in FIG. 3A. Accordingly, as illustrated in FIG. 3B, the overall rate of decrease in illuminance ΔL1 of the lamp also increases faster than the rate of decrease in illuminance ΔL of the lamp for the model in FIG. 3A.

Accordingly, the detection of the two values, the lamp voltage V and the lamp usage period T, allows the accurate prediction of the deterioration in illuminance compared with the detection of the lamp usage period T only. Since a degree of the increase in lamp voltage and an advance velocity of the devitrification with respect to the lamp usage period T differ depending on the type of the lamp, the deterioration characteristic data is preliminary obtained depending on the type of the lamp and is stored in the memory (the ROM 81, the RAM 82).

The following describes a specific calculation method for the rate of decrease in illuminance ΔL of the lamp. The rate of decrease in illuminance ΔL of the lamp is expressed by the following formula (1) using the lamp voltage V and the lamp usage period T.

$$\Delta L = a \times V + b + c \times (T-T0) \qquad (1)$$

Since the rate of decrease ΔL has a tendency to linearly increase by the lamp voltage V and the lamp usage period T, the rate of decrease ΔL can be further preferably estimated from the formula (1). The coefficients a, b, c, and T0 are coefficients (the deterioration characteristic data) predetermined according to the type of the lamp. As described above, these coefficients may be preliminary stored in the memory (the ROM 81, the RAM 82).

With a projection-type image display device that can switch a use mode of a lamp among a plurality of modes (a usual mode, a power-saving mode with illuminance lower than the usual mode, and a similar mode) of different amounts of luminescence of the lamp, a property of the reduction in illuminance differs depending on the use mode of the lamp. Therefore, the deterioration coefficient in the above-described formula (1) needs to be a different value also depending on the use mode of the lamp. Accordingly, it is only necessary to preliminary store the respective deterioration coefficients for usual mode and deterioration coefficients for power-saving mode in the memory (the ROM 81, the RAM 82). In the case where the control unit 8 obtains user instruction information on the change in the use mode of the lamp via the operation input unit 10 during the operation of the projection-type image display device, it is only necessary to transmit the control information on the change in the use mode of the lamp to the ballast power supply 3, read the deterioration coefficients corresponding to the use mode of the lamp after the switching from the memory (the ROM 81, the RAM 82), and use the deterioration coefficients for the control using the formula (1).

With a projection-type image display device that has a mode to switch the amount of luminescence of the lamp in multiple stages according to an input image, it is only necessary to prepare the deterioration coefficients for each switchable lamp electric power, preliminary store the respective deterioration coefficients in the memory (the ROM 81, the RAM 82), and use the deterioration coefficients corresponding to the lamp electric power switched according to the input image for the control using the formula (1).

As described above, the deterioration in illuminance has the two factors. However, depending on the type of the discharge lamp, a progress of the devitrification at an inner surface of the glass of the arc tube may be slow compared with the deterioration in the lamp electrodes. In such case, a member depending on the lamp usage period T may be deleted from the formula (1), and the approximation may be executed by the following formula (1)′.

$$\Delta L = a \times V + b \quad (1)'$$

In this case, it is only necessary to detect only the lamp voltage V, bringing an effect of simple control.

FIG. 4 is drawings describing the image correction processing and the effect. The illuminance L decreases as the elapse of the lamp usage period T. An amount of correction C by the image correction processing unit 43 is determined according to the rate of decrease ΔL estimated based on the lamp voltage V or the combination of the lamp voltage V and the lamp usage period T. A magnitude of the amount of correction C with respect to the rate of decrease in illuminance ΔL is predetermined according to the correction content. Thus obtaining the lamp voltage V or the lamp voltage V and the lamp usage period T allows determining the amount of correction C without the calculation of the estimated value of the rate of decrease in illuminance ΔL itself. The image quality correction content to compensate the reduction in illuminance is a process described in the description of FIG. 1 such as the brightness correction, the contrast correction, the sharpness correction, the gamma correction, and the retinex processing. Only one kind of these processes may be performed, or these processes may be performed in combination appropriately according to the category of the image. The magnitude of the amount of correction C with respect to the rate of decrease in illuminance ΔL may be predetermined according to the correction content. Consequently, visibility G of the image can be recovered.

FIG. 4 illustrates the improved effect by gray scale. As the lamp usage period T increases, the illuminance decreases in a display image before the correction, thus deteriorating the visibility. This deterioration in visibility progresses like G0→G1→G2 as the reduction in illuminance. In contrast to this, performing the image correction (for example, the brightness correction) maintains the visibility like G0′→G1′→G2′ while the illuminance of the image after the correction decreases.

Figure 5A:
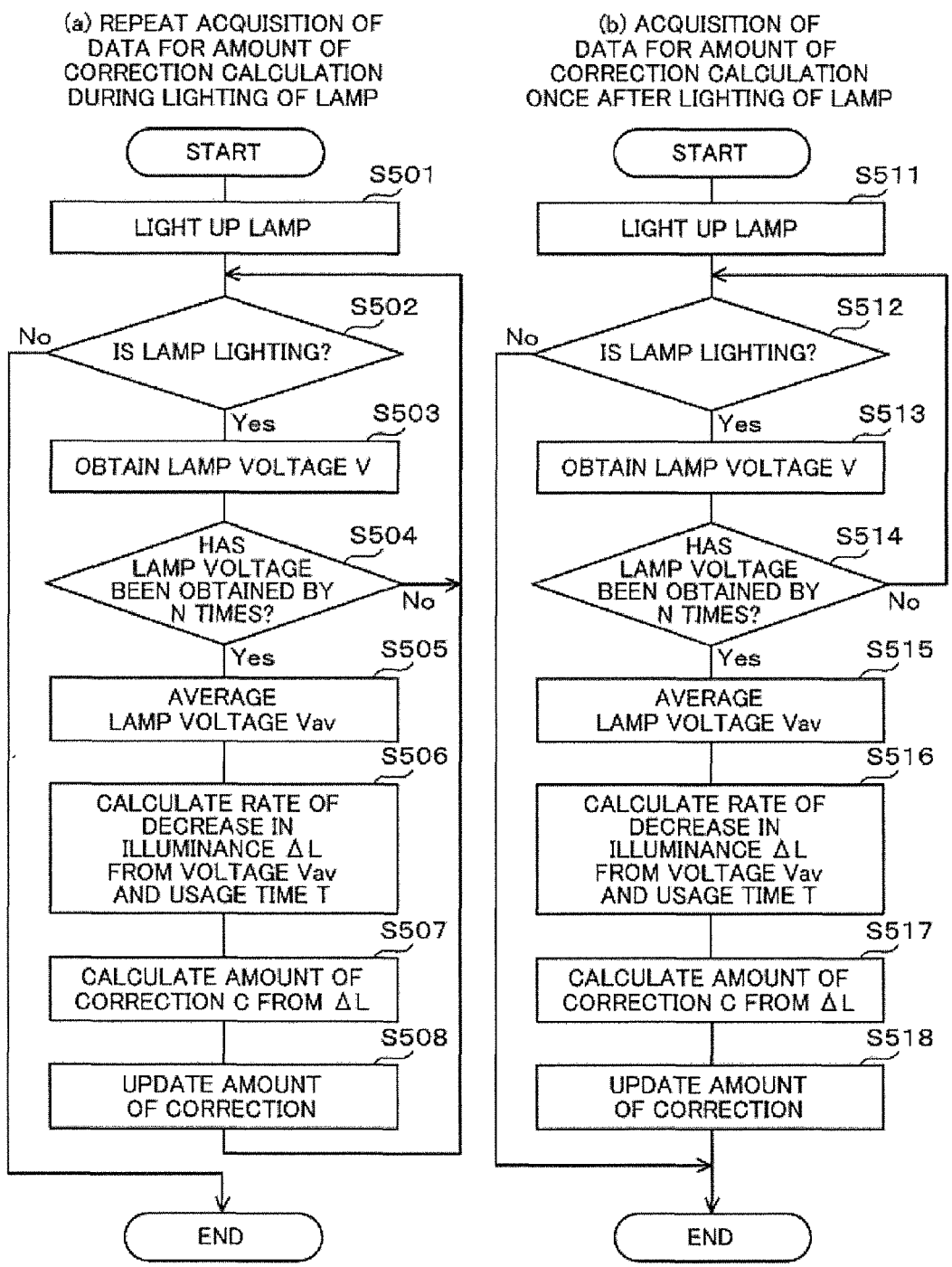
FIG. 5A is flowcharts illustrating an entire control on a change in an amount of correction of the image correction processing.

FIG. 5A are flowcharts illustrating an entire control of the image correction processing. As a control method, for example, (a) is a method of repeatedly obtaining data for amount of correction C calculation during the lighting of the lamp and (b) is a method of obtaining the data for amount of correction C calculation only once at one-time lamp lighting. Any methods may be applied. The control unit 8 progresses the control of the change in amount of correction of image. However, the user may be allowed to select any one of the methods.

The following describes the process flows for the method of (a). First, at S501, the high pressure start circuit 31 is driven to light up the discharge lamp 21. At S502, whether the lamp is lit or not is judged. When the lamp is lighting, the process proceeds to S503, and the lamp voltage detection unit 341 obtains the voltage V of the lamp. The microcomputer 342 transmits the information on the obtained lamp voltage to the control unit 8, and a memory provided with the control unit 8, the RAM 82, or a similar memory stores the information. At S504, whether the lamp voltages are obtained by a predetermined number of times (N times) or not is judged. This predetermined number of times N is the number of times determined to obtain an average value of the lamp voltage V. In the case of less than N times, the process returns to S502 and again the lamp voltage V is obtained. A time interval until the subsequent lamp voltage is obtained is separately determined.

When the number of obtained lamp voltages reaches N times at S504, the process proceeds to S505. Using the already stored N pieces of lamp voltage, an average lamp voltage Vav is calculated. That is, this example calculates the average value of the lamp voltages V by the predetermined number of times N as the data for amount of correction C calculation. The lamp usage period T is obtained from the lighting period managing unit 9. At S506, the rate of decrease in illuminance ΔL is calculated from the average voltage Vav and the lamp usage period T by the formula (1). Data for deterioration calculation stored in the ROM 81 and the RAM 82 are used for the calculation.

At S507, the control unit 8 determines the process content for image correction (for example, the brightness correction) and calculates the amount of correction C appropriate for the calculated rate of decrease in illuminance ΔL. At S508, the control unit 8 causes the image correction processing unit 43 to perform the change processing of the amount of image correction C. In this respect, the amount of image correction C before the change is replaced by the amount of image correction C after the change, and the amount of image correction C after the changes is stored to update the memory (the ROM 81, the RAM 82).

As long as the memory (the ROM 81) stores the last amount of correction C at the previous lighting of the lamp, the amount of correction is not deleted even if the projection-type image display device is powered off. Accordingly, from the lighting of the lamp at S501 until S508, the image correction processing unit 43 may perform the image correction using this last amount of correction C stored in the memory (the ROM 81). Alternatively, until S508, the correction by the image correction processing unit 43 may be turned off.

After S508, the number of obtained lamp voltages is reset to zero and the process returns to S502 to repeat the above-described flow. When the rate of decrease in illuminance ΔL changes, the amount of correction C is changed to the new amount of correction C and the image correction processing is performed.

The process flow by the above-described method (a) uses the average value Vav of N times of the lamp voltages as the data for amount of correction C calculation. Therefore, the value is less likely to be affected by a local voltage variation in a short period. Since the amount of correction C for the image processing can be changed repeatedly at a predetermined time interval, this method (a) is preferable to light up the lamp successively for a long time. Any given time interval for the change processing of the amount of correction C can be set by changing the number of obtained lamp voltages N and the acquisition interval or inserting a stand-by period.

The data for amount of correction C calculation is not limited to the average value Vav of N times of the lamp voltages. Any various arithmetic operation results using the lamp voltage may be used. However, the arithmetic operation results based on the plurality of lamp voltage acquisition results are less likely to be affected by the local voltage variation and therefore are preferable. The following description simply expresses the "data for amount of correction C calculation" or the "data for amount of correction calculation" in the similar meaning.

For a while after the lighting of the lamp, the lamp voltage is often unstable. The detection of the lamp voltage at this time possibly obtains a value inappropriate for the use of the determination on the amount of correction C. To improve this, as a modification of the above-described flowchart (a), the stand-by period may be set by a predetermined time between S501 and S502 so as not to proceed to S502. The correction processing by the image correction processing unit 43 during this stand-by period may be set to be off or the correction processing using the last amount of correction C at the previous lighting of the lamp may be performed during this stand-by period.

The following describes the process flow by the method (b). First, the lamp lights up at S511. After that, at S512, whether the lamp is lighting or not is judged. When the lamp is lighting, the process proceeds to S513, and the lamp voltages by the number of N times is obtained from S512 to S514. The average value Vav of the lamp voltages is calculated at S515, the rate of decrease in illuminance ΔL is calculated at S516, and then the amount of correction C is calculated at S517. After that, at S518, the amount of correction C used for the image correction by the image correction processing unit 43 is updated to the value calculated at S517. The amount of correction C after this update is stored in the memory (the ROM 81, the RAM 82), and the process is terminated. Accordingly, after the lighting of the lamp, this method changes the amount of correction for the image correction processing only once.

The last amount of correction C at the previous lighting of the lamp is stored in the memory (the ROM 81), and from the lighting of the lamp at S511 until S518, the image correction processing unit 43 may perform the image correction processing using this last amount of correction C stored in the memory (the ROM 81). Alternatively, until S518, the correction by the image correction processing unit 43 may be turned off.

To take measures against the instability of the lamp voltage immediately after the lighting of the lamp, similarly to the above-described modification of the flowchart (a), the stand-by period may be set by the predetermined time between S511 and S512 so as not to proceed to S512. The correction processing by the image correction processing unit 43 during this stand-by period may be set to be off or the correction processing using the last amount of correction C at the previous lighting of the lamp may be performed during this stand-by period.

The method (b) is appropriate for a short continuous lighting period of the lamp. That is, since the reduction in lamp illuminance due to deterioration over time is a phenomenon appearing after the elapse of long time, the amount of correction for image correction needs not to be always frequently changed. Accordingly, compared with the method (a), this method reduces a process load on the control unit 8, ensuring achieving the change processing of the amount of correction corresponding to the change in the rate of decrease in illuminance ΔL.

The processes by the above-described method (a) and method (b) do not describe operations in the case where the use mode of the lamp is switched. Since the projection-type image display device that can switch the use mode of the lamp among the plurality of modes of different amounts of luminescence of the lamp switches the use mode of the lamp, a process corresponding to this switching may be performed.

FIG. 5B is drawings describing the management of the amounts of correction C by the projection-type image display device with the plurality of lamp modes of different amounts of luminescence of the lamp. (a) is an example of three lamp modes, which are a lamp mode 1, a lamp mode 2, and a lamp mode 3. Here, assuming the lamp illuminance in the lamp mode 1 as 100%, the lamp illuminance in the lamp mode 2 is relatively assumed as 70%, and the lamp illuminance in the lamp mode 3 is relatively assumed as 50%.

The projection-type image display device 1 stores amounts of correction C1, C2, and C3 for image processing corresponding to the respective lamp modes in the memory (the ROM 81, the RAM 82). The image correction processing unit 43 selectively uses these values according to the selected lamp mode. However, the amounts of correction C1, C2, and C3 may not be discriminated according to the lamp modes but may be shared and managed. With the of the lamp lamp usage period T of 0, the amounts of correction C1, C2, and C3 are set to be initial values appropriate for the respective lamps. The acquisition processing of data for amount of correction calculation by the method (a) or the method (b) in FIG. 5A or an acquisition processing of data for amount of correction calculation after lamp mode switch process, which will be described later, updates the amounts of correction C1, C2, and C3. At powering-off the projection-type image display device 1, storing the latest amounts of correction C1, C2, and C3 in the memory (the ROM 81) allows the use of the latest amounts of correction C1, C2, and C3 subsequently at the next start even if the power supply is turned off.

FIG. 5B(b) illustrates the management of the amounts of correction where the lamp mode that automatically changes the illuminance of the lamp in multiple stages according to the input image signal or a similar signal is provided. Since the lamp modes 1, 2, and 3 are similar to FIG. 5B(a), the following omits the description. As described above, a lamp mode 4 is a lamp mode that automatically changes the illuminance of the lamp in multiple stages. In the example of (b), the lamp illuminance is switched into three stages, 100% (a state 1), 70% (a state 2), and 50% (a state 3).

In such case, even in the identical lamp mode, the amounts of correction may be managed depending on the different lamp illuminance state. Accordingly, in the example of (b), it is only necessary to prepare amounts of correction C41, C42, and C43 for the respective state 1, state 2, and state 3 so as to switchably use the amounts of correction C41, C42, and C43. However, the amounts of correction C41, C42, and C43 may not be discriminated according to the lamp state and may be shared and managed. With a lamp mode where the lamp is used at the illuminance identical to the illuminance used by the lamp mode that automatically changes the illuminance of the lamp in multiple stages, the amounts of correction may be shared and managed.

In the example of (b), both the lamp illuminance in the lamp mode 1 and the state 1 in the lamp mode 4 are the lamp illuminance of 100%; therefore, the amount of correction C1 is shared and managed, and the amount of correction C41 may not be separately prepared. Similarly, both the lamp illuminance in the lamp mode 2 and the state 2 in the lamp mode 4 are the lamp illuminance of 70%; therefore, the amount of correction C2 is shared and managed, and the amount of correction C42 may not be separately prepared. Similarly, both the lamp illuminance in the lamp mode 3 and the state 3 in the lamp mode 4 are the lamp illuminance of 50%; therefore, the amount of correction C3 is shared and managed, and the amount of correction C43 may not be separately prepared.

Next, FIG. 5C is drawings describing process flows corresponding to the change in lamp mode or state. FIG. 5C(a-2) is a process flow for a modification that changes the processes by the method (a) in FIG. 5A so as to be processes for the change in lamp mode or state. Like reference numerals designate identical elements throughout FIG. 5A(a) and FIG. 5C(a-2).

The lamp lights up at S501, and the lamp mode or the state at this time is obtained at S521. Next, at S502, whether the lamp is lit or not is judged. When the lamp is lighting, the following processes are performed before the lamp voltage V is obtained at S503.

First, at S522, the lamp mode or the state is obtained. Next, at S523, whether the lamp mode or the state has changed or not is judged. When the lamp mode or the state is not changed, the process proceeds to S503 and the process similar to the content described in FIG. 5A(a) is performed. At S523, when the lamp mode or the state has been changed by, for example, the user operation via the operation input unit 10, the process proceeds to S524. As illustrated in FIG. 5B, in the case of the use of the amounts of correction C (such as C1, C2, C3, C41, C42, and C43 in FIG. 5B) with use modes of different lamp illuminances or with states of different lamp illuminances, the kind of the amount of correction used by the image correction processing unit 43 is changed according to the lamp mode or the state after the change before the process proceeds to S524.

At S524, the number of obtained lamp voltages is reset. Next, at S525, the deterioration coefficients corresponding to the lamp mode or the state after the change are read from the memory (the ROM 81, the RAM 82) for use in the calculation of the rate of decrease in illuminance ΔL at S506.

Although processes after the acquisition of the lamp voltage V at S503 are similar to FIG. 5A(a), as described above, in the case of the use of the amounts of correction C with the use modes of different lamp illuminances or with the states of different lamp illuminances, the amount of correction C targeted at S507 and S508 becomes the amount of correction corresponding to each use mode or state.

Even with the use modes or the states of different lamp illuminances, as long as the appropriate deterioration coefficients are set at S525, the amount of correction can be shared among the plurality of use modes or states for use. In this case, the amount of correction C targeted at S507 and S508 becomes one kind in some cases.

For example, even if the lamp mode or the state is changed while the update processing of the image processing correction value after the lamp is lit up is continued, the above-described process flow in FIG. 5C(a-2) allows continuing the appropriate image correction processing and the change processing of the correction value according to the lamp mode or the state after the change.

Next, FIG. 5C(b-2) is a process flow for a modification that changes the processes by the method (b) in FIG. 5A so as to handle the change in lamp mode or state. Like reference numerals designate identical elements throughout FIG. 5A(b) and FIG. 5C(b-2).

The lamp lights up at S511, and the lamp mode or the state at this time is obtained at S531. Next, at S512, whether the lamp is lit or not is judged. When the lamp is lighting, the following processes are performed before the lamp voltage V is obtained at S513.

At S532, the lamp mode or the state is obtained. Next, at S533, whether the lamp mode or the state has changed or not is judged. When the lamp mode or the state is not changed, the process proceeds to S513 and the process similar to the content described in FIG. 5A(b) is performed. At S533, when the lamp mode or the state has been changed by, for example, the user operation via the operation input unit 10, the process proceeds to S534. Similarly to S524 in FIG. 5C(a-2), in the case of the use of the amounts of correction C (such as C1, C2, C3, C41, C42, and C43 in FIG. 5B) for the use modes of different lamp illuminances or for the states of different lamp illuminances, the kind of the amount of correction used by the image correction processing unit 43 is changed according to the lamp mode or the state after the change before the process proceeds to S534.

At S534, the number of obtained lamp voltages is reset. Next, at S535, the deterioration coefficients corresponding to the lamp mode or the state after the change are read from the memory (the ROM 81, the RAM 82) for use in the calculation of the rate of decrease in illuminance ΔL at S516.

Processes after the acquisition of the lamp voltage V at S513 are similar to FIG. 5A(b). Even with the use modes or the states of different lamp illuminances, by setting the appropriate deterioration coefficients at S535, the amount of correction C can be shared among the plurality of use modes or states for use. In this case, the amount of correction C targeted at S517 and S518 becomes one kind in some cases.

As described above, in the case of the use of the amounts of correction C (such as C1, C2, C3, C41, C42, and C43 in FIG. 5B) with the use modes of different lamp illuminances or with the states of different lamp illuminances, when the lamp mode or the state is changed after the amount of correction is updated at S518, using the average Vav (different from the voltage in the lamp use mode or the state after the change in some cases), which is obtained at S515 in FIG. 5C, the rate of decrease in illuminance ΔL is calculated using the deterioration coefficients corresponding to the lamp use mode or the state after the change at S516. The processes at S517 and S518 are performed on the amount of correction C corresponding to each of the lamp use mode or the state after the change. Thus, the amount of correction C of each kind can be updated. This ensures updating the amount of correction corresponding to each of the lamp use mode and the state even without obtaining the lamp voltage, which is the data for amount of correction calculation, again even if the lamp use mode or the state is changed.

Another example that calculates the amount of correction C corresponding to each of the lamp use mode or the state after the change without obtaining the lamp voltage, which is the data for amount of correction calculation, again may be as follows. A difference or a ratio between the plurality of different amounts of correction corresponding to the plurality of different lamp use modes or states is predetermined. An amount of correction among them is calculated through obtaining the lamp voltage, which is the data for amount of correction calculation. After that, an arithmetic operation using this calculated amount of correction and the difference or the ratio calculates the amounts of correction C corresponding to the respective lamp use modes or the states. This eliminates the need for calculating the rate of decrease in illuminance ΔL on each of the lamp use mode or the state, thereby ensuring achieving a further simple process.

With the above-described process flow in FIG. 5C(b-2), for example, even if the lamp mode or the state has been changed, the image correction unit can use the preferable amount of correction after the voltage acquisition processing N times as one set without performing the voltage acquisition processing again.

As described in FIG. 5A(b), the reduction in lamp illuminance due to the deterioration over time is a phenomenon appearing after the elapse of long time. Accordingly, simply updating the amount of correction calculation data only once at each lighting of the lamp brings a sufficient effect as the control of the amount of correction for compensation of the deterioration in the illuminance of lamp. This ensures a reduction in processing load of the control unit 8 compared with the case where the amount of correction calculation data is repeatedly updated successively during the lighting.

Next, FIG. 5D(b-3) is yet another modification of FIG. 5C(b-2). FIG. 5D(b-3) is a process flow that obtains the data for amount of correction calculation once for each lamp mode or state at one-time lamp lighting in the case of the use of the amounts of correction C (such as C1, C2, C3, C41, C42, and C43 in FIG. 5B) for the use modes of different lamp illuminances or for the states of different lamp illuminances. Like reference numerals designate identical elements throughout FIG. 5A(b) and FIG. 5D(b-3).

The lamp lights up at S511, and the lamp mode or the state during the lighting is obtained at S541. Next, at S512, whether the lamp is lit or not is judged. When the lamp is lighting, the process proceeds to S542. At S542, whether the amounts of correction corresponding to all the lamp modes and the states have been calculated or not is judged. When the calculation has already been performed, the process is terminated. When the lamp mode or the state where the amount of correction has not been calculated is present, the process proceeds to S543.

The lamp mode or the state is obtained at S543. At S544, whether this lamp mode or state is changed from the previously obtained lamp mode or state or not is judged. When the lamp mode or the state has been changed, the process proceeds to S545. The kind of the amount of correction used by the image correction processing unit 43 is changed according to the lamp mode or the state after the change before the process proceeds to S545.

At S545, the number of obtained lamp voltages is reset. Afterwards, at S546, the deterioration coefficients corresponding to the lamp mode or the state after the change are read from the memory (the ROM 81, the RAM 82). Next, at S547, whether the amount of correction has already been calculated for the currently selected lamp mode or state or not is judged. When the amount of correction has already been calculated, whether the amount of correction needs to be updated or not is judged at S548, and if necessary, the process returns to S512. When the amount of correction has not been calculated yet at S547, the process proceeds to S513.

Since the processes from S513 to S518 are similar to those of FIG. 5C(b-2), the following omits the description. Note that, the target amount of correction is the amount of correction corresponding to the lamp mode or the state after the change among the plurality of kinds of amounts of correction. After the update of the amount of correction at S518, the state that the amount of correction for the current lamp mode or state has already been calculated is stored at S550 and then the process returns to S512. When the lamp mode or the state is changed after completion of the calculation of the amounts of correction for all the lamp modes and states, it is only necessary to refer to the calculated amounts of correction without obtaining the data for amount of correction calculation again and change the amount of correction to the amount of correction appropriate for the lamp mode or the state after the change.

According to the above-described process flow in FIG. 5D(b-3), for example, the voltage acquisition processing is performed N times as one set once for each lamp mode or state to obtain the respective average lamp voltages. Depending on the lamp, thus calculating the average lamp voltages for each lamp mode or state allows the accurate determination of the amount of correction C in some cases. This reduces the amount of processing compared with FIG. 5C(a-2), which repeatedly calculates the average lamp voltage successively.

With the above-described projection-type image display device according to this embodiment, for example, like S502 in FIG. 5A(a) or FIG. 5C(a-2) and S512 in FIG. 5A(b), FIG. 5C(b-2), or FIG. 5D(b-3), in the case where the light of the discharge lamp is put out after the start of lighting of the discharge lamp and before the first update processing of the amount of correction after this lighting, the control unit 8 performs the control so as not to perform the update processing of the amount of correction for the image quality correction by the image correction processing unit 43. This ensures preventing the amount of correction stored in the memory (the ROM 81, the RAM 82) from being updated by the amount of correction calculated based on an abnormal voltage value different from the usual lighting state.

With the projection-type image display device that can switch the plurality of kinds of states with different amounts of luminescence of the lamp, the above-described processes according to Example 1 may use the actual lamp usage period itself as it is as the lamp usage period T used for calculation of the rate of decrease in illuminance ΔL. However, instead of this, a correction lamp usage period T' weighted according to the use state of the lamp may be calculated for use. Specifically, with the projection-type image display device that can switch the use mode of the lamp among the plurality of modes with different amounts of luminescence of the lamp, a deterioration speed of lamp differs depending on the used mode in some cases. Taking this point into consideration, it is only necessary to set the weighting for the lamp usage period in the mode with large amount of luminescence by multiplying a relatively large coefficient and set the weighting for the lamp usage period in the mode with little amount of luminescence by multiplying a relatively small coefficient. With the projection-type image display device that has the mode to switch the amount of luminescence of the lamp in multiple stages according to the input image, it is only necessary to weight the lamp usage periods in respective stages with different amounts of luminescence of the lamp by multiplying respective different coefficients for integration.

The following shows a formula (2) as one example of a calculation formula for the correction lamp usage period T'.

$$T' = w1 \times T1 + w2 \times T2 + w3 \times T3 \qquad (2)$$

In the formula (2), T1, T2, and T3 indicate the lamp usage periods using the lamp in three kinds of respective states with different amounts of luminescence. The w1, w2, and w3 are weighting coefficients accommodating the amounts of luminescence of the lamp in the three kinds of states. With the use states with the further number of different amounts of luminescence, it is only necessary to increase the lamp usage period and the kind of the weighting coefficient after w3×T3 for integration.

Here, in the case where the correction lamp usage period T' is used for the formula (1) to calculate the rate of decrease in illuminance ΔL, to further accurately approximate the calculated rate of decrease in illuminance ΔL to the actual rate of decrease in illuminance, it is only necessary to increase the weighting coefficient for the use state with larger amount of luminescence among the plurality of lamp use states with different amounts of luminescence. In the example of the formula (2), assume that the lamp usage period in the use state with the largest amount of luminescence among the three kinds of states as T1, the lamp usage period in the use state with the second largest amount of luminescence as T2, and the lamp usage period in the use state with the smallest amount of luminescence as T3, it is only necessary to configure the setting so as to meet a relationship: w1>w2>w3 where w1, w2, and w3 are the weighting coefficients of positive values. As described above, the use of the correction lamp usage period T' calculated based on the actual lamp usage period allows further accurately estimating the rate of decrease in illuminance ΔL, ensuring further preferably setting the amount of correction for the image correction by the image correction processing unit.

Figure 8A:
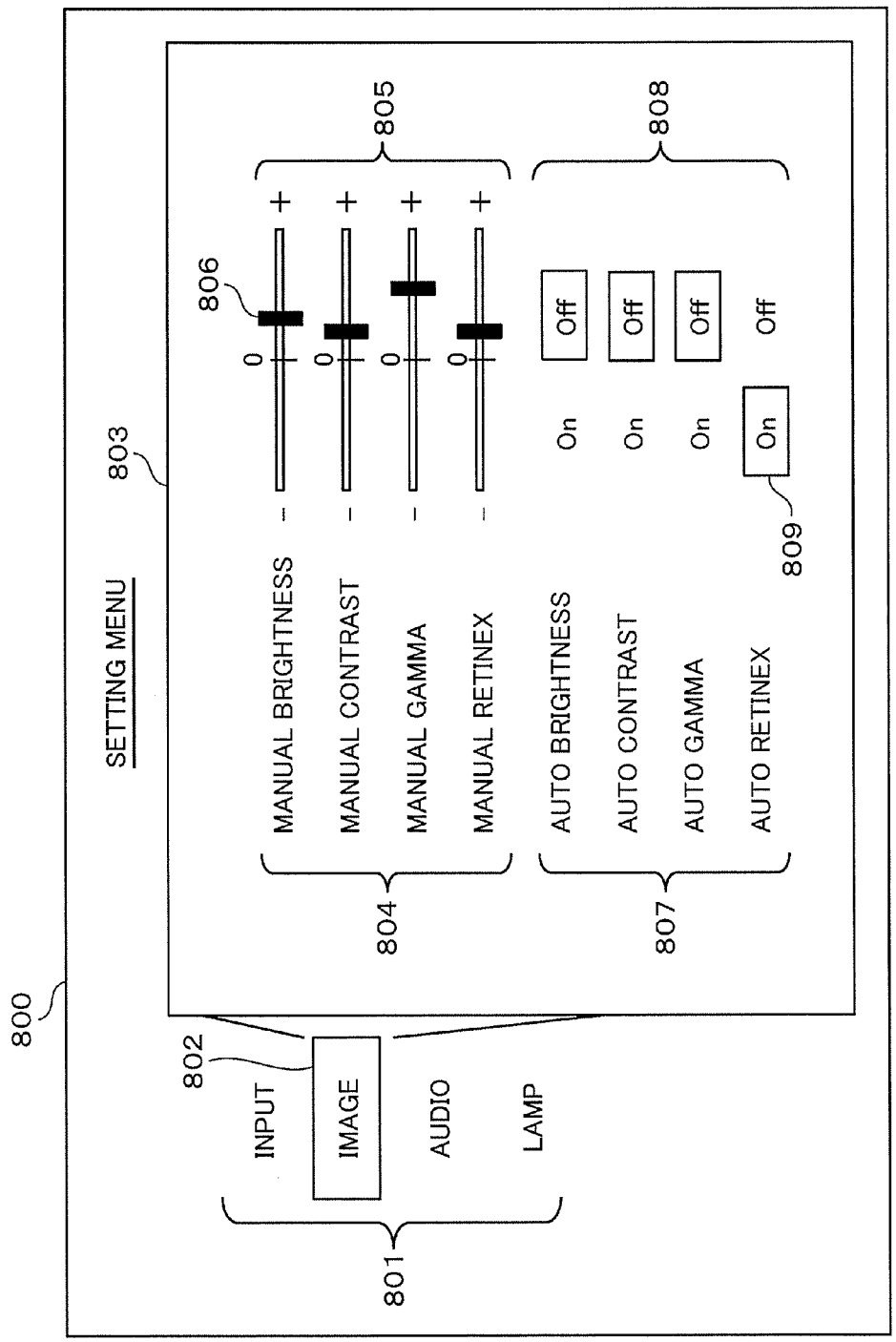
FIG. 8A is a drawing illustrating an example of an image quality adjustment menu of the projection-type image display device according to Example 1.
Figure 9:
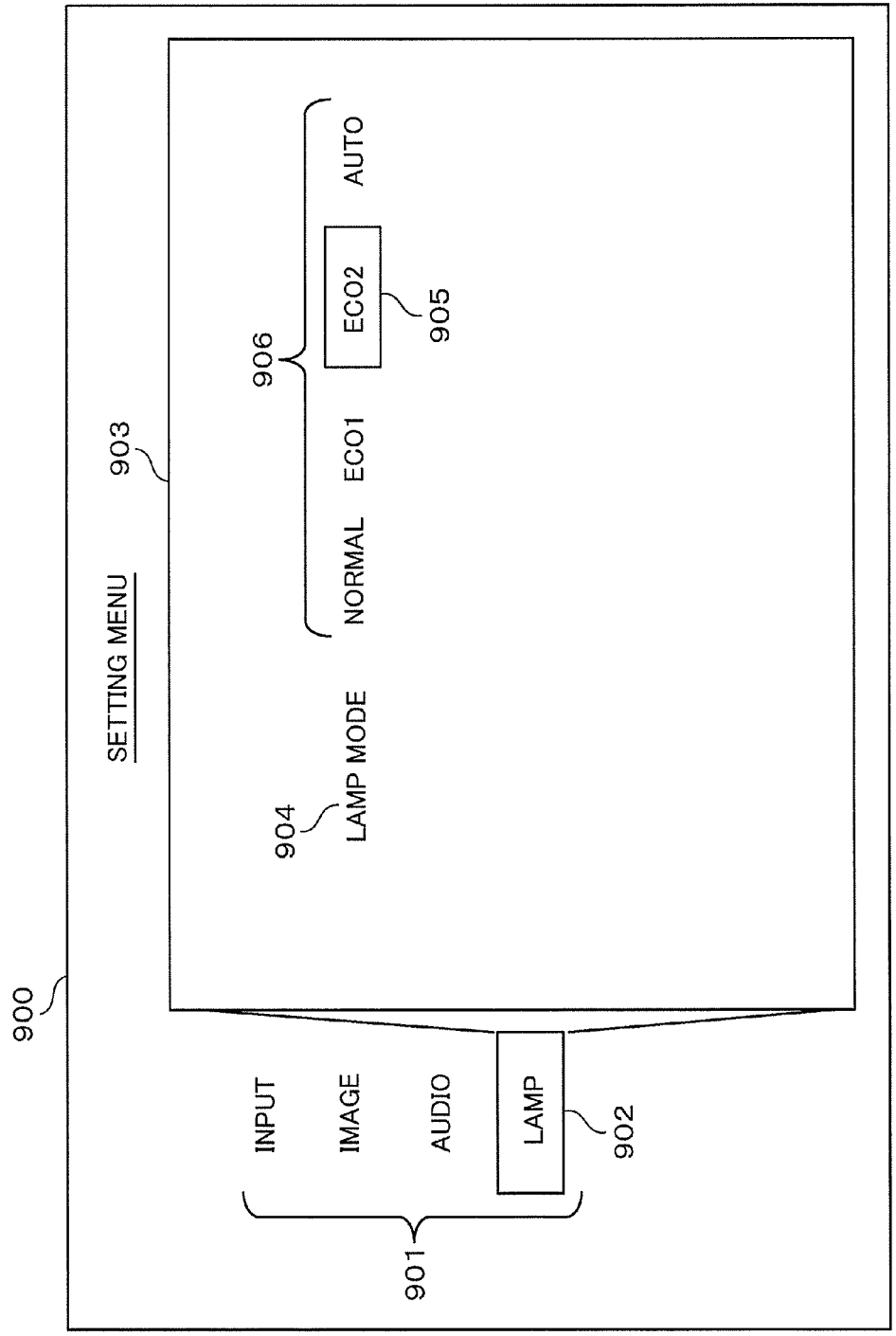
FIG. 9 is a drawing illustrating an example of a lamp adjustment menu of the projection-type image display device according to Example 1.

The following describes a setting menu screen in the projection-type image display device of this example using FIG. 8A, FIG. 8B, and FIG. 9.

The menu screens described in FIG. 8A, FIG. 8B, and FIG. 9 are displayed by the following processes. First, this example configures the projection-type image display device so as to include a menu screen creating unit (not illustrated). This menu screen creating unit may be, for example, disposed between the image correction processing unit 43 and the display element driving unit 44. The menu screen creating unit, based on control of the control unit 8, creates the menu screen to perform a process of superimposing the created menu screen on the output image by the image correction processing unit 43, a replacement process, or a combination process for arranged display.

FIG. 8A is a setting menu screen for the image correction processing. In a menu screen 800, large categories 801 for menu items are displayed as a plurality of items ("INPUT," "IMAGE," "AUDIO," and "LAMP"). For example, an operation of a cursor 802 selects one item among the large categories 801 for menu items. The operation input unit 10 obtains the operation with the cursor via a button on a main body or signal from a remote controller and transmits corresponding information to the control unit 8. The control unit 8 controls the menu screen creating unit to change the screen created by the menu screen creating unit. The created menu screen is output to the image display element 5 instead of the output image by the image signal processing unit 4 or is output by being superimposed on this output image and is projected outside via the projection optical system. Since any operable object displayed in the menu screen 800 is operated by the similar process, the following omits the repeated description.

In the example of FIG. 8A, an image quality adjustment menu screen frame 803 is a screen frame displayed when the "IMAGE" item is selected among the large categories 801 for menu items. In the image quality adjustment menu screen frame 803, for example, as manual image quality adjustment menu items 804, items such as "MANUAL BRIGHTNESS," "MANUAL CONTRAST," "MANUAL GAMMA," and "MANUAL RETINEX" are displayed, and the respective items are adjustable.

For example, operating cursors 806 on slide bars 805, which are illustrated in the drawing, to the right and left adjusts the amounts of correction from an initial value 0 to a + direction or − direction. For example, in "MANUAL RETINEX," it is only necessary to change the weighting of a specific light component among the plurality of separated light components to adjust the weighting for re-combination. The user may adjust these manual image quality adjustment menu items according to the user's preference. While these adjustment menus are enabled, the adjustment values of these adjustment menus are reflected to the image correction by the image correction processing unit.

Next, in the image quality adjustment menu screen frame 803, for example, as an automatic image quality adjustment menu item 807, items such as "AUTO BRIGHTNESS," "AUTO CONTRAST," "AUTO GAMMA," and "AUTO RETINEX" are displayed. These respective setting items can be set to be ON and OFF by the operation of cursors 809 in a setting area 808 by the user. These automatic image quality adjustment menus are processes including the image correction, which compensates the deterioration in illuminance of the lamp described using FIG. 2 to FIG. 5C.

In the example of FIG. 8A, the automatic image quality adjustment menu is divided and separated into respective "BRIGHTNESS" (brightness adjustment), "CONTRAST" (contrast adjustment), "GAMMA" (gamma adjustment), "RETINEX" (retinex adjustment), and a similar menu. The image correction is performed on the respective items turned ON among the automatic image quality adjustment menus. The change of the amounts of correction for the respective image corrections may be changed and updated by the methods described using FIG. 2 to FIG. 5C.

For the image quality adjustment turned ON in the automatic image quality adjustment menu items 807, the respective kinds of image corrections by the image correction processing unit 43 may use the amount of correction calculated by the operation (such as an addition, a weighted addition, and an operation that sets an upper limit value and a lower limit value to these operations) including: the amount of correction corresponding to the adjustment value in the manual image quality adjustment menu item 804, and the amount of correction for image correction to compensate the deterioration in illuminance of the lamp described using FIG. 2 to FIG. 5C.

As another example, regarding the image quality adjustment turned ON in the automatic image quality adjustment menu items 807 may be set to 0 in the adjustment value in the manual image quality adjustment menu items 804. The amount of correction for the image quality adjustment turned ON in the automatic image quality adjustment menu items 807 needs not to be simply only the amount of correction for image correction, which compensates the deterioration in illuminance of the lamp described using FIG. 2 to FIG. 5C. The amount of correction may be an amount of correction taking into account of the amount of correction or a similar value calculated by the operation according to the feature value of the image signal. It is only necessary to at least perform the correction based on the amount of correction calculated by the arithmetic operation including the amount of correction for image correction by the image correction processing unit 43 described using FIG. 2 to FIG. 5C.

With the above-described example of the setting menus in FIG. 8A, the user can select ON/OFF of the respective manual image quality adjustments and image corrections, which compensate the deterioration in illuminance of the lamp, among the plurality of image quality adjustment items, providing an effect that the user can set more preferable image quality.

The following describes FIG. 8B. FIG. 8B is a drawing where some of the setting menus in FIG. 8A are changed. Like reference numerals designate the identical menu items and objects to FIG. 8A, and the following omits the repeated description.

Different from FIG. 8A, FIG. 8B displays only "AUTO PICTURE CONTROL" 810 as an automatic image quality adjustment menu item. An operation of a cursor 811 by the user can set ON and OFF of this image quality adjustment item. As the menu of the "AUTO PICTURE CONTROL" 810, for example, only one kind of the image quality adjustment item in the automatic image quality adjustment menu item 807 in FIG. 8A may be thus displayed, and using only this one kind of image quality adjustment, the image correction to compensate the deterioration in illuminance of the lamp described using FIG. 2 to FIG. 5C may be performed. Alternatively, a plurality of image quality adjustments such as "BRIGHTNESS" (brightness adjustment), "CONTRAST" (contrast adjustment), "GAMMA" (gamma adjustment), and "RETINEX" (retinex adjustment) may be combined and the image correction to compensate the deterioration in illuminance of the lamp described using FIG. 2 to FIG. 5C may be performed. This brings an effect identical to the state where the ON/OFF setting of the plurality of setting menus in the automatic image quality adjustment menu items 807 can be simultaneously changed in the setting menus in in FIG. 8A. This simplifies the menu items, thereby ensuring providing the menu screen not complicated and easily understood for the user.

Similarly to FIG. 8A, the image correction where both the amount of correction corresponding to the adjustment value in the manual image quality adjustment menu item 804 and the amount of correction for image correction, which is described using FIG. 2 to FIG. 5C, calculated with the "AUTO PICTURE CONTROL" 810 turned ON are taken into account may be performed. This allows easily setting the image correction, which compensates the deterioration in lamp while making the detailed image adjustment with the manual image quality adjustment menus possible, bringing good balance of usability for the user.

The following describes a setting screen for use mode of the lamp using FIG. 9. In a menu screen 900 illustrated in FIG. 9, similarly to the large categories 801 in FIG. 8A and FIG. 8B, large categories 901 for menu items are displayed as a plurality of items ("INPUT," "IMAGE," "AUDIO," and "LAMP"). In the example of FIG. 9, "LAMP," which is an item that allows the selection of setting menus for lamp, is selected with a cursor 902. In view of this, a lamp setting menu frame 903 is displayed at the display position of the image quality adjustment menu screen frame 803 in FIG. 8A and FIG. 8B. In the lamp setting menu frame 903, a setting item 904 for lamp mode is illustrated. The setting item 904 allows the user to select one lamp mode among a plurality of lamp use modes 906 ("NORMAL," "ECO1," "ECO2," and "AUTO" in the example of this drawing) through an operation of a cursor 905. For example, configuring these lamp modes corresponding to the respective lamp modes (the lamp mode 1, the lamp mode 2, the lamp mode 3, and the lamp mode 4) shown in FIG. 5B(b) allows achieving the switching of the lamp modes shown in FIG. 5B(b), which are described in FIG. 5B and FIG. 5C, with the setting item 904 for lamp mode in FIG. 9.

The above-described Example 1 restrains the reduction in visibility of the projection image even if the illuminance of the discharge lamp is deteriorated over time, providing an effect of ensuring the display of high-image quality images over a long period of time. This ensures easily predicting the deterioration in illuminance of the discharge lamp over time from the lamp voltage and the lamp usage period, ensuring achieving the simple configuration.

Example 2

Example 2 includes a microcomputer in the lamp block 2 of Example 1 to add a function to the projection-type image display device.

Figure 6:
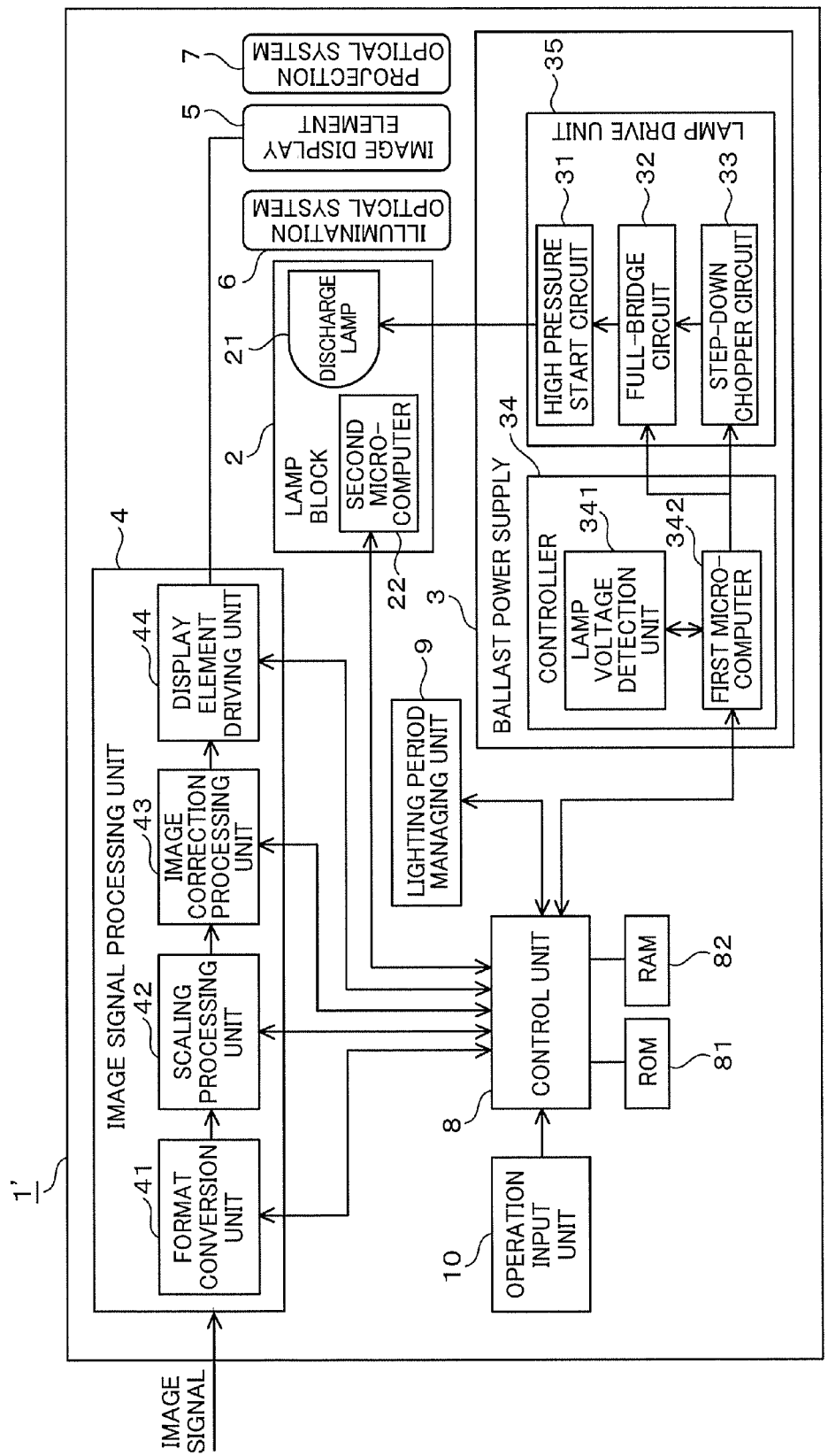
FIG. 6 is a block configuration diagram illustrating a projection-type image display device according to Example 2.

FIG. 6 is a block configuration diagram illustrating the projection-type image display device according to Example 2. Like reference numerals designate corresponding or identical elements described in Example 1 (FIG. 1).

The following omits a repeated description of operations similar to those of Example 1. The following describes only operations different from those of Example 1.

A projection-type image display device 1' newly adds a microcomputer 22 in the lamp block 2. The following designates this as a "second microcomputer" and designates the microcomputer 342 provided in the ballast power supply 3 as a "first microcomputer" for discrimination. The second microcomputer 22 stores identification information (ID) and performance data of the discharge lamp 21, which is housed in the lamp block 2, and can communicate with the control unit 8. The performance data includes deterioration in illuminance property data unique to the lamp, namely, the coefficients a, b, c, and T0 in the formula (1) and operation history of the lamp (such as the accumulated usage period).

The control unit 8 obtains information on the lamp voltage V from a first microcomputer 342 and information on the lamp usage period T from the lighting period managing unit 9. Additionally, the control unit 8 obtains the deterioration in illuminance property data of the discharge lamp 21 in use from the second microcomputer 22, thus ensuring further accurately calculating the deterioration in illuminance of the discharge lamp 21.

The second microcomputer 22 is housed in the lamp block 2 together with the discharge lamp 21 and is integrally handled. That is, even in the case where the discharge lamp 21 is once removed from the projection-type image display device 1 and is used for another device, the discharge lamp 21 is exchanged in conjunction with the second microcomputer 22 in each lamp block 2. Then, since the second microcomputer 22 stores the operation history of the discharge lamp 21, reading history information (the accumulated usage period), ensures accurately calculating the deterioration in illuminance of the discharge lamp 21.

Figure 7:
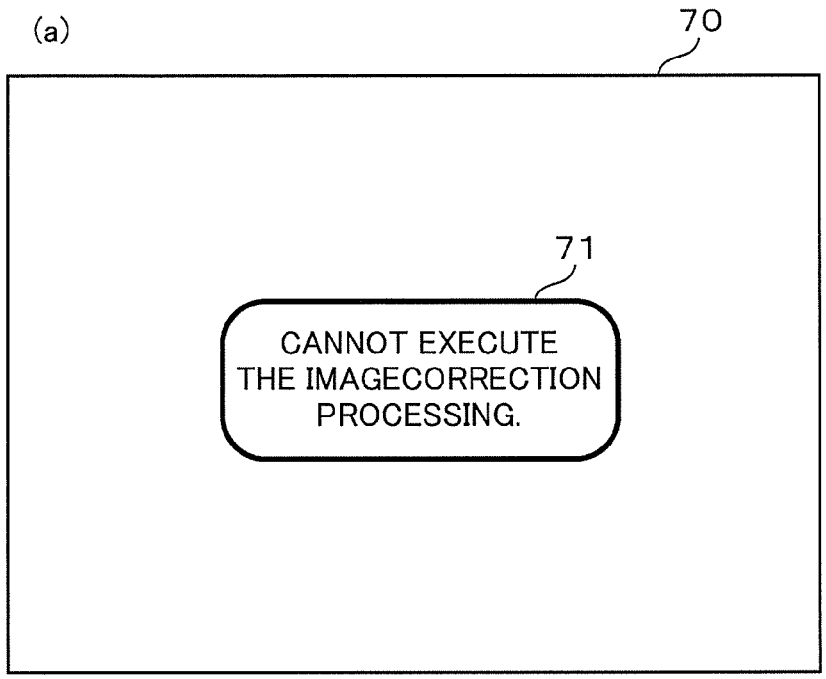
FIG. 7 is drawings illustrating examples of an alarm message display when the lamp is mounted.
Figure 7:
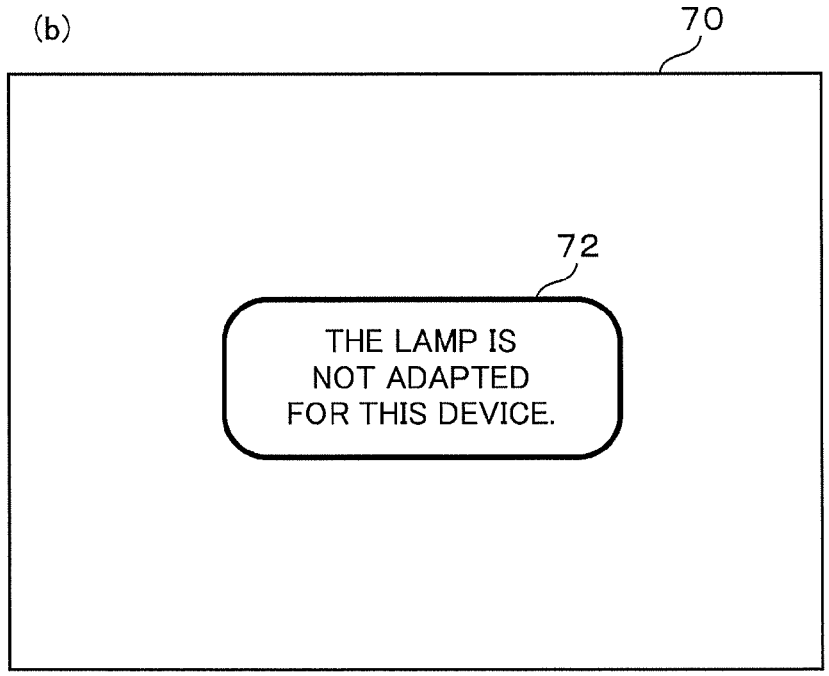

The following describes another example of use using the second microcomputer 22. FIG. 7 is drawings illustrating an example of an alarm message display when the lamp is mounted. (a) is a message display in the case where communications with the second microcomputer 22 fail. That is, if the communications fail between the control unit 8 and the second microcomputer 22 due to some sort of cause, the performance data of the discharge lamp 21 cannot be obtained, making the calculation of the deterioration in illuminance and the image correction impossible. In such case, the control unit 8 displays a message 71 such as "CANNOT EXECUTE THE IMAGE CORRECTION PROCESSING." on a display screen 70. Regarding this as the timing, the user can inspect the second microcomputer 22 and exchange the lamp block 2.

Even if the second microcomputer 22 is incapable, as described in Example 1, the use of the average deterioration characteristic data of the discharge lamp stored in the ROM 81 or the RAM 82 allows predicting the deterioration in illuminance and performing the image correction processing. Therefore, a selection screen to select of which deterioration characteristic data is used by the user may be displayed.

(b) is a message display in the case where the mounted discharge lamp 21 is an unadapted product. The control unit 8 reads the identification information (ID) on the discharge lamp 21 stored in the second microcomputer 22 and compares the identification information with registered information to judge whether the discharge lamp adapts this display device or not. If judged that the discharge lamp is an unadapted lamp, the display screen 70 displays a message 72 such as "THE LAMP IS NOT ADAPTED FOR THIS DEVICE." Regarding this as the timing, the user can exchange the lamp block 2 with an adapted component.

With Example 2, the use of the performance data unique to the discharge lamp mounted to the device allows accurately obtaining the deterioration in illuminance of the lamp and executing the image quality correction processing at high accuracy. The alarm display for inappropriate mounted lamp brings an effect of preventing a device trouble in advance.

In the above-described description, the notation of "memory (the ROM 81, the RAM 82)" may be understood as a meaning of the memory (the ROM 81 or the RAM 82).

In the above-described respective examples of the present invention, since the steps in the respective entire control flowcharts and other control processes are achievable by the control by the control unit 8, some descriptions are omitted.

REFERENCE SIGNS LIST 1, 1' . . . projection-type image display device,
2 . . . lamp block,
3 . . . ballast power supply,
4 . . . image signal processing unit,
5 . . . image display element,
6 . . . illumination optical system,
7 . . . projection optical system,
8 . . . control unit,
9 . . . lighting period managing unit,
10 . . . operation input unit,
21 . . . discharge lamp,
22 . . . second microcomputer,
31 . . . high pressure start circuit,
32 . . . full-bridge circuit,
33 . . . step-down chopper circuit,
34 . . . controller,
341 . . . lamp voltage detection unit,
342 . . . microcomputer (first microcomputer),
35 . . . lamp drive unit,
41 . . . format conversion unit,
42 . . . scaling processing unit,
43 . . . image correction processing unit,
44 . . . display element driving unit,
81 . . . ROM,
82 . . . RAM.

The invention claimed is:

1. A projection-type image display device including a discharge lamp as a light source, comprising:
    a lamp driving unit configured to drive the discharge lamp;
    a lamp voltage detection unit configured to detect a voltage between electrodes (hereinafter, a lamp voltage) of the discharge lamp;
    an image correction processing unit configured to perform an image quality correction of an image signal supplied to an image display element;
    a control unit configured to control an amount of correction for the image correction processing unit based on the lamp voltage detected by the lamp voltage detection unit, and
    a menu screen creating unit,
    wherein, via a menu screen created by the menu screen creating unit, both a first setting item regarding an image quality adjustment and a second setting item regarding an image quality adjustment are settable,
    the first setting item is configured to control the amount of correction for the image correction processing unit based on the lamp voltage detected by the lamp voltage detection unit, and
    the second setting item is configured to allow a user to select a parameter regarding the amount of correction not based on the lamp voltage detected by the lamp voltage detection unit.

2. The projection-type image display device according to claim 1, comprising
    a lighting period managing unit configured to manage an accumulated lighting period (hereinafter, a lamp usage period) of the discharge lamp, wherein
    the control unit is configured to control the amount of correction for the image correction processing unit based on the lamp voltage detected by the lamp voltage detection unit and the lamp usage period obtained from the lighting period managing unit.

3. The projection-type image display device according to claim 2, comprising
    a memory that stores deterioration characteristic data for a calculation of a reduction in illuminance of the discharge lamp, wherein
    the control unit is configured to calculate a rate of the reduction in illuminance of the discharge lamp from the lamp voltage and the lamp usage period using the deterioration characteristic data stored in the memory, the control unit being configured to control the amount of correction for the image correction processing unit according to the rate of decrease in illuminance.

4. The projection-type image display device according to claim 1, comprising
    a memory, wherein:
    the memory is capable of storing the amount of correction, and
    the control unit uses the amount of correction stored in the memory for the image quality correction by the image correction processing unit when the discharge lamp is lit up, the control unit being configured to perform update processing of the amount of correction for the image quality correction by the image correction processing unit after an elapse of a predetermined time.

5. The projection-type image display device according to claim 1, wherein
when a light of the discharge lamp is put out after a start of lighting of the discharge lamp and before a first update processing of the amount of correction after the lighting, the control unit is configured to perform a control such that the update processing of the amount of correction for the image quality correction by the image correction processing unit is not performed.

6. The projection-type image display device according to claim 1, wherein
the correction content performed by the image correction processing unit includes a brightness correction, a contrast correction, a sharpness correction, a gamma correction, or a retinex processing.

7. The projection-type image display device according to claim 1, wherein
the image correction processing unit is configured to perform image correction processing using an amount of correction, the amount of correction being calculated by an operation based on both a value of the image quality adjustment of the first setting item and a value of the image quality adjustment of the second setting item set via the menu screen created by the menu screen creating unit.

8. A projection-type image display device including a discharge lamp as a light source, comprising:
a lamp driving unit configured to drive the discharge lamp;
a lamp voltage detection unit configured to detect a voltage between electrodes (hereinafter, a lamp voltage) of the discharge lamp;
an image correction processing unit configured to perform an image quality correction of an image signal supplied to an image display element;
a control unit configured to control an amount of correction for the image correction processing unit based on the lamp voltage detected by the lamp voltage detection unit; and
a lighting period managing unit configured to manage an accumulated lighting period (hereinafter, a lamp usage period) of the discharge lamp,
wherein the control unit is configured to control the amount of correction for the image correction processing unit based on the lamp voltage detected by the lamp voltage detection unit and the lamp usage period obtained from the lighting period managing unit,
the discharge lamp is housed in a lamp block, the lamp block including a microcomputer, the microcomputer storing deterioration characteristic data unique to the discharge lamp, the microcomputer being configured to be communicable with the control unit, and
the control unit is configured to calculate a rate of decrease in illuminance of the discharge lamp from the lamp voltage and the lamp usage period using deterioration characteristic data unique to the discharge lamp obtained from the microcomputer through the communication, the control unit being configured to control the amount of correction for the image correction processing unit according to the rate of decrease in illuminance.

9. The projection-type image display device according to claim 8, wherein
when the control unit fails the communication with the microcomputer, the control unit is configured to display a message indicating failure of execution of the correction processing by the image correction processing unit on a display screen.

10. The projection-type image display device according to claim 8, wherein:
the microcomputer stores identification information on the discharge lamp housed in the lamp block, and
the control unit is configured to display a message indicative of the discharge lamp being unadapted when the identification information on the discharge lamp obtained from the microcomputer differs from registered information.

* * * * *